United States Patent
Chuah et al.

(10) Patent No.: US 7,324,545 B2
(45) Date of Patent: Jan. 29, 2008

(54) METHODS AND APPARATUS FOR RELIABLE POINT TO MULTIPOINT COMMUNICATIONS

(75) Inventors: Mooi Choo Chuah, Marlboro, NJ (US); Kameswara Rao Medapalli, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 966 days.

(21) Appl. No.: 10/403,423

(22) Filed: Mar. 31, 2003

(65) Prior Publication Data

US 2005/0259643 A1    Nov. 24, 2005

(51) Int. Cl.
  *H04L 12/403*  (2006.01)
(52) U.S. Cl. .................. 370/449; 370/346
(58) Field of Classification Search ........... 370/311, 370/312, 332, 333, 346, 395.4, 431, 395.41, 370/432, 395.42, 433, 443, 444, 447, 449, 370/464, 465, 468, 477
See application file for complete search history.

(56) References Cited

U.S. PATENT DOCUMENTS 6,480,505 B1 * 11/2002 Johansson et al. .......... 370/449
6,657,987 B1 * 12/2003 Kumar et al. .............. 370/346
6,829,227 B1 * 12/2004 Pitt et al. ................... 370/329
7,142,524 B2 * 11/2006 Stanforth et al. ........... 370/328

OTHER PUBLICATIONS

Paul, S. et al: Reliable Multicast Transport Protocol (RMTP), IEEE Journal On Selected Areas in Communications, vol. 15, No. 3, Apr. 1997, pp. 407-421.
Sun, Min-Te, et al: Reliable MAC Layer Multicast In IEEE 802.11 Wireless Networks, Proceedings of the International Conference On Parallel Processing (ICPP'02), 0-7695-1677-7/02, 2002.

(Continued)

*Primary Examiner*—Wing Chan
*Assistant Examiner*—Mark A. Mais
(74) *Attorney, Agent, or Firm*—Matthew J. Hodulik

(57) ABSTRACT

An advance over the prior art is achieved through an efficient method to retransmit erroneous frames by identifying the users who are most likely to experience a frame error and requests retransmissions from them. Since the recovery is done by starting with the most likely, second most likely etc., the invention results in faster recovery of data. Moreover, the invention reduces the battery consumption of subsequent mobile nodes by suppressing the retransmission requests that were already made by nodes preceding it. A key element of the invention is to rank the set of receiver nodes in the order of decreasingly worse channel conditions, i.e., from worst to best. Hence, with K receiver nodes, a transmit node assigns rank 1 to a receiver node to which it has the poorest radio channel condition. Similarly, it assigns rank K to the receiver node to which it has the best radio channel condition. The channel condition is known at the receiver by keeping a simple measure of the number of data frames correctly received so far and the total number of frames transmitted to it. This information can be periodically sent back to the transmitter and thus aiding in the ranking procedure. Alternatively, if the transmitter is capable of sending a pilot/beacon, the receiver can do some averaging of received signal strength and provide such information back to the transmitter.

21 Claims, 4 Drawing Sheets

OTHER PUBLICATIONS

Kuti, J. et al; "Reliable Multicast In Wireless-Access Wireless LANs", Wireless Networks, 7, 359-369, 2001, Kulwer Academic Publishers, 2001, Manufactured in the Netherlands.

Nonnenmacher, J. et al: "Parity-Based Loss Recovery For reliable Multicast Transmission", IEEE/ACM Transaction on Networking, vol. 6, No. 4, Aug. 1998, pp. 349-361.

* cited by examiner

NUMBER OF PACKETS SUCCESSFULLY RECEIVED

COMPARISON OF MEAN DELAY PER PACKET PERFORMANCE

METHODS AND APPARATUS FOR RELIABLE POINT TO MULTIPOINT COMMUNICATIONS

FIELD OF THE INVENTION

The present invention relates generally to communications networks and more particularly to wireless multipoint communications regarding such networks.

BACKGROUND OF THE INVENTION

Reliable point to multipoint communications, referred to as multicast or broadcast depending upon whether a node is transmitting to a subset of receivers or to the entire set of receivers, is an efficient method to use communication resources. Prior work on multicast has been focused on wire-line networks. An example is the RMTP (Reliable Multicast Transport Protocol) protocol, S. Paul, K. K. Sabnani, J. C. Lin, S. Bhattacharya, '*Reliable Multicast Transport Protocol (RMTP)*', IEEE Journal on Selected Areas in Communications, Vol. 15 No. 3, designed for the Internet. Reliable multicast over a wireless medium is a relatively new area and results from multicast over wire-line networks cannot readily be employed mainly because the wireless medium is prone to much higher error rates and because mobility introduces complications from a networking point of view. Moreover, in multi-access channels, nodes operate in an ad-hoc manner forcing a methodical approach to arbitrate the usage of the channel for efficient multicast. Most of the prior work on reliable multicast over a wireless medium has focused on designing efficient schemes for (a) enabling a transmitting node to acquire a channel and (b) allowing the receiving nodes to express their intent to receive data from the transmitter. Examples of such methods include Batch Mode Multicast proposed in M-T. Sun, L. Huang, A. Arora, T-H. Lai, '*Reliable MAC Layer Multicast in IEEE 802.11 Wireless Networks*', Proceedings of ICPP 2002 and Leader based policy in J. Kuri and S. K. Kasera, '*Reliable Multicast in Multi-Access Wireless LANs*', Wireless Networks, Vol. 7, 2001, pp. 359-369. An efficient parity based multicast scheme based on Forward Error Correction (FEC) is proposed in J. Nonnenmacher, E. W. Biersack and D. Towsley, '*Parity-Based Loss Recovery for Reliable Multicast Transmission*', IEEE Transactions on Networking, Vol. 7, No. 4, Aug. 1998.

Due to differences in radio channel conditions among different wireless nodes, the frame error rate between any two pairs of nodes is different. This is one of the key observations which has not been addressed in previous studies. For example, in the Leader based method, once you decide on who the leader is, the sender proceeds in a stop and go fashion to deliver the intended data. Fixing the leader in this fashion can result in severe penalties to other users. Similarly the batch mode multicast simply focuses on minimizing the number of contention cycles needed to acquire the wireless medium than on exploiting the differences in channel conditions. Although the parity based scheme introduces the idea of retransmitting parity packets instead of original data packets, it does not address the issue of exploiting the fact that different users have different radio channel conditions. Accordingly, there is a need for an improved multicast methodology which takes into account differing radio channel conditions.

SUMMARY OF THE INVENTION

An advance over the prior art is achieved through an efficient method to retransmit erroneous frames by identifying the users who are most likely to experience a frame error and requests retransmissions from them. Since the recovery is done by starting with the most likely, second most likely etc., the invention results in faster recovery of data. Moreover, the invention reduces the battery consumption of subsequent mobile nodes by suppressing the retransmission requests that were already made by nodes preceding it.

A key element of the invention is to rank the set of receiver nodes in the order of decreasingly worse channel conditions, i.e., from worst to best. Hence, with K receiver nodes, a transmit node assigns rank 1 to a receiver node to which it has the poorest radio channel condition. Similarly, it assigns rank K to the receiver node to which it has the best radio channel condition. The channel condition is known at the receiver by keeping a simple measure of the number of data frames correctly received so far and the total number of frames transmitted to it. This information can be periodically sent back to the transmitter and thus aiding in the ranking procedure. Alternatively, if the transmitter is capable of sending a pilot/beacon, the receiver can do some averaging of received signal strength and provide such information back to the transmitter.

One embodiment of the invention sets forth a method of multicasting packets to a set of receiver nodes in a communications network. The method includes the steps of providing a weighted ranking of the set of receiver nodes by channel conditions from poorest to best. A polling scheme is implemented to solicit retransmission requests one at a time from said set of receiver nodes. The polling scheme solicits retransmission requests utilizing the ranking such that the receiver nodes having poorest relative channel conditions receive a significantly greater frequency of polling requests than the receiver nodes having better channel conditions.

BRIEF DESCRIPTION OF THE DRAWINGS

A more complete understanding of the present invention may be obtained from consideration of the following detailed description of the invention in conjunction with the drawing, with like elements referenced with like references, in which.

DETAILED DESCRIPTION

The present invention is a methodology for providing improved efficiency for multipoint transmissions. Although an exemplary embodiment of the invention is described in connection with the wireless transmission between a first mobile transmitter and a number of other mobile receivers, it would be apparent to those skilled in the art that the present invention is applicable to other wireless network areas requiring multipoint transmissions including, base station transmitters and mobile station receivers. Additionally, the present invention is applicable to the Internet and all wireless transmitting protocols including 1×EV-DO, CDMA 2000, IEEE 802.11 and UMTS.

One important aspect of the present invention is to rank the set of receiver nodes in the order of worst to best channel conditions. Hence, with K receiver nodes, a transmit node assigns rank 1 to the receiver node which has the poorest radio channel condition relative to the transmit node. Similarly, the transmit node assigns rank K to the receiver node which has the best radio channel condition relative to the transmit node. The channel condition is known at the receiver by keeping a simple measure of the number of data frames correctly received so far and the total number of frames transmitted to it. This information can be periodically sent back to the transmitter, thus aiding in the ranking procedure. For instance, the periodic send back of information to the transmitter can be sent using in-band or out-of-band control, as would be understood by those skilled in the art. Alternatively, if the transmitter is capable of sending a pilot/beacon, the receiver can perform some averaging of received signal strength and provide such information back to the transmitter.

Figure 1:
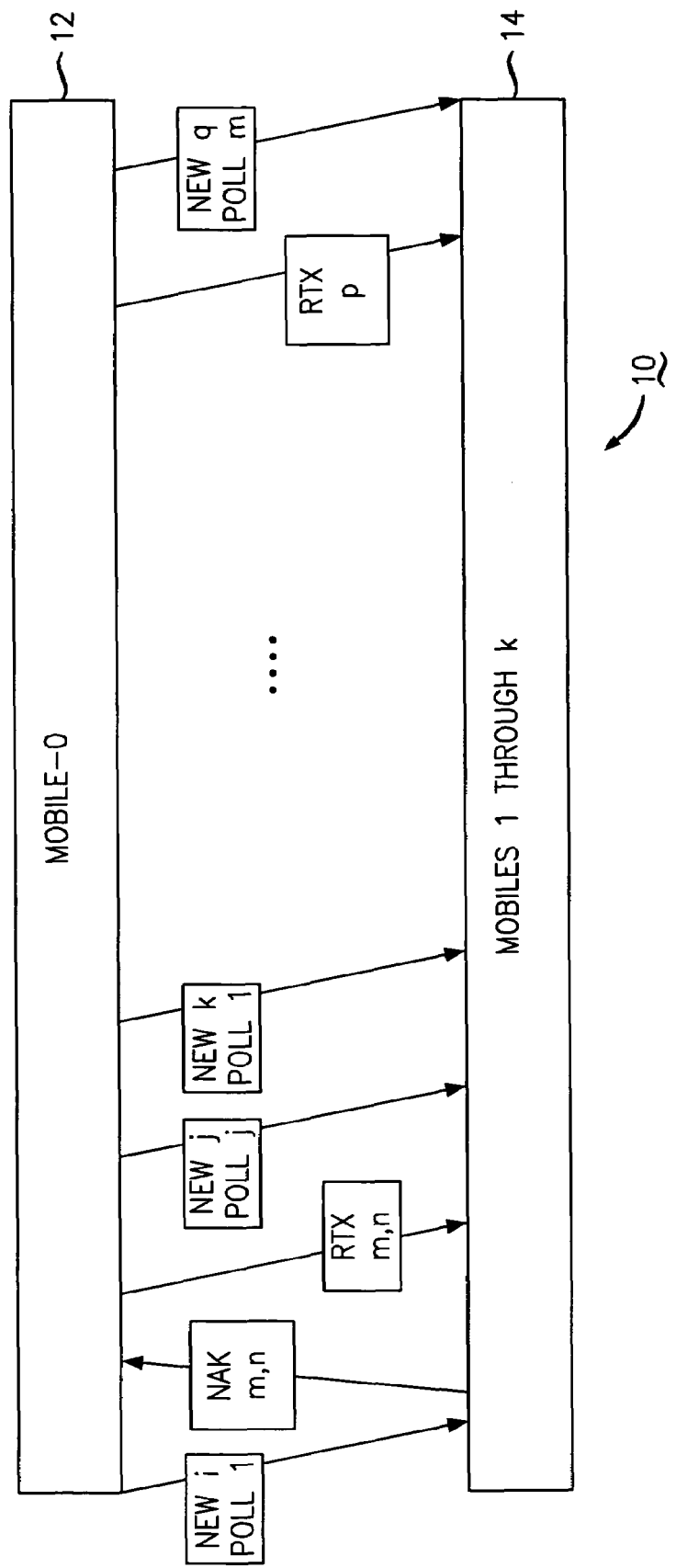
FIG. 1 is an exemplary embodiment of a portion of a wireless communication network which implements the methodology of the present invention.

Referring to FIG. 1, the present invention is described with reference to a portion of an exemplary wireless communications network 10. As shown, the network 10 includes at least one transmitting node denoted as Mobile-0 (12) and receiving nodes denoted as Mobiles-1 through Mobile-K (14). A general functionality of the present invention is described as follows. The transmitting node 12 starts by sending a Frame[n] to the mobiles 14. Preceding the message is control information dictating the user that is authorized to send feedback for this frame. The transmitting node 12 solicits feedback from users (receiving nodes 14) experiencing less favorable channel conditions more often than users who are in relatively favorable channel conditions. To this end, Mobile-0 (12) computes the relative weights of the Mobiles 1 through K (14) and ranks and/or selects them according to the weight. The method of computing the weights and selection based on weights is explained herein.

Assume now that after the weight calculation and selection, mobile-i (a first user) is chosen to provide feedback. Note that it is highly likely that mobile-i is mobile-1, since this user is the user in the worst channel condition. Hence, if mobile-i has not received Frame[n] correctly, it can send a NAK (negative acknowledgement) followed by any data it may wish to send upstream. Note that at his point it is worth mentioning that not all implementations can send a NAK after incorrectly receiving a frame. Several implementations detect that a particular frame is missing only when they receive a frame correctly. This is done by discovering a difference in the next expected sequence number and the sequence number of the frame received. However, some implementations can detect that a packet was indeed received, but could not be decoded correctly. In that case a NAK can be sent even after incorrectly receiving a frame. Mobiles-2 through K wait for their turn to come. Hence Mobiles-2 through K will be operating in an energy efficient mode by sending NAKs only when requested. It should also be understood that although the invention describes ranking mobiles from worst to best channel conditions, it would be understood that even the worst receiver has a channel condition at or above some acceptable threshold that makes transmitting to it practical. Users below this threshold are not included in the ranking and/or selection process.

Note that when mobile-i receives the Frame[n] incorrectly, it sends a NAK message which contains a retransmission requests for Frame[n] (and, for example, any other missing frames sent before that frame). In such a case, Mobile-0 retransmits a requested Frame[m] (m<n) as long as a variable Num_Retransmissions[m] is less than $N_{max}$, where $N_{max}$ is the maximum number of times a frame can be retransmitted. Finally, Mobile-0 retransmits Frame[n] and increments the variable Num_Retransmissions[n], for example, from 0 to 1. Preceding the next frame, Frame[n+1], will be a control message dictating which mobile node is allowed to respond, e.g., with a NAK or other like response. Again, based on the weights of the user nodes, Mobile-0 computes the next user node that is allowed to send feedback. For instance, assume now that the user is user-j (a next user). (Although, as would be understood, with the probabilistic or other polling schemes described herein, it is highly likely that mobile-1 again is chosen simply because its weight is highest). Note, however, that if the retransmissions performed for mobile-i have helped mobile-j recover its lost data, then mobile-j will then not send any NAKs.

With regard to the above, if the mobile-i received Frame [n] and all the previous frames correctly, then mobile-i will not send any NAK. In this case, mobile-0 will go ahead and transmit Frame[n+1] without wasting this slot. Note that it is possible that other mobiles may not have received Frame [n] correctly. However, these mobiles wait for their turn to NAK and mobile-0 will retransmit only at that time. In one exemplary embodiment of the invention, the above steps are repeated every time a frame is transmitted. Alternatively, these steps can take place at selected intervals. These steps are also illustrated in the description below.

Figure 2:
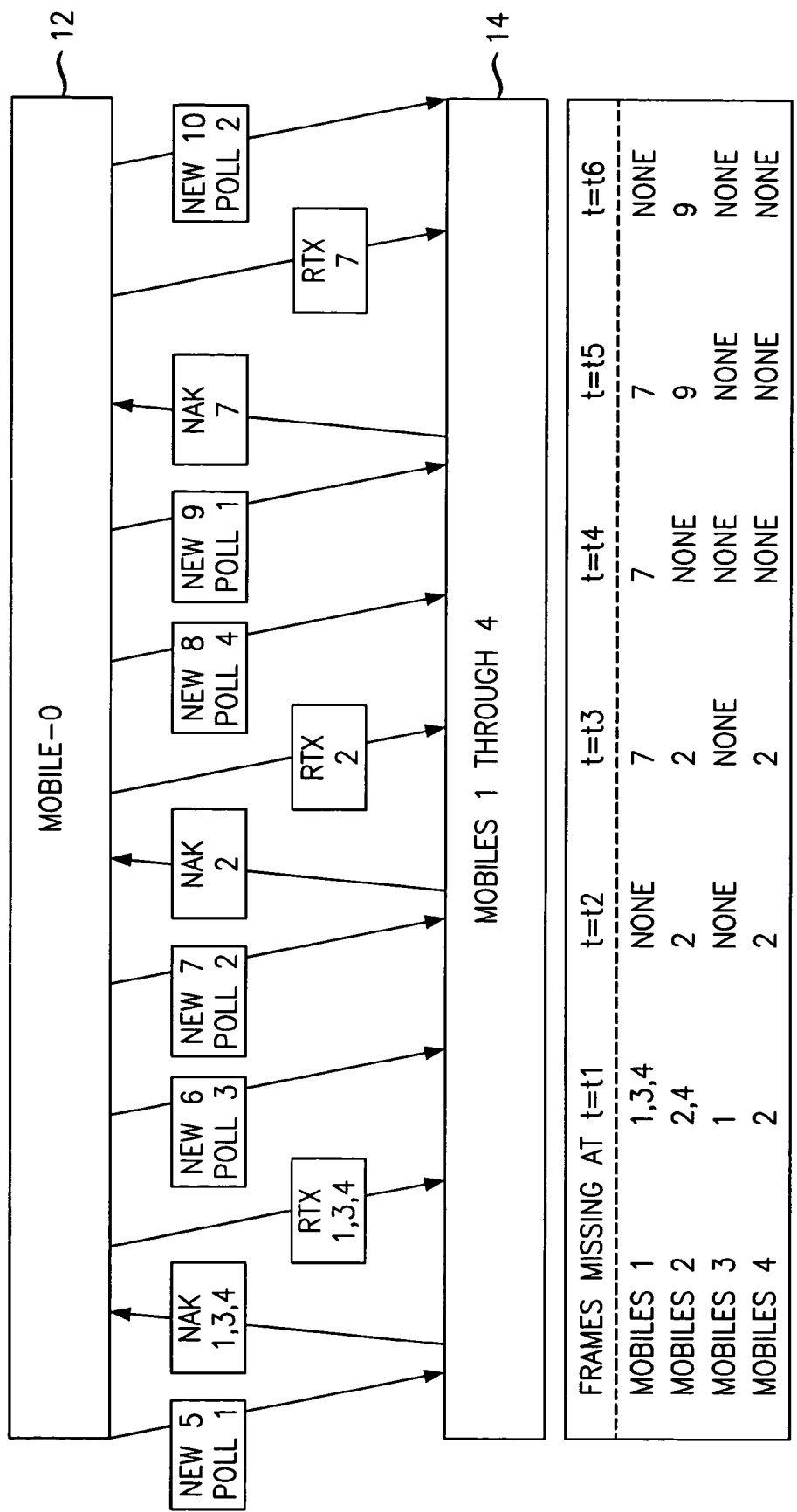
FIG. 2 is an exemplary embodiment of a portion of a wireless communication network which implements a specific example of the methodology of the present invention.

The present invention is now described with respect to a specific multicast example. Referring to FIG. 2, a wireless multicast transmission takes place from Mobile 0 (12) to Mobile 1 through Mobile 4 (14). In FIG. 2, it can be seen that at time t=t1, Mobile-1 has frames 1, 3 and 4 missing (i.e., not correctly received), Mobile-2 has frames 2 and 4 missing, Mobile 3 has frame 1 missing and Mobile 4 has frame 2 missing. At this time, Mobile-0 transmits new frame number 5 and also polls Mobile-1. Note, as was discussed previously, we are assuming Mobile 1 to have the worst channel condition and that is why it is ranked and weighted as Mobile-1. It is assumed that frame 5 is received correctly by Mobile-1 and hence Mobile-1 requests NAK (negative acknowledgement) messages for frames 1, 3 and 4 so that they can be retransmitted. Mobile-0 completes retransmitting these frames at time t=t2. Assuming all the retransmissions were correctly received by Mobile-1, Mobile-2 and Mobile-3, we see that at time t=t2, Mobile-0 has no frames missing. Moreover, these retransmissions also helped Mobile-2 recover frame 4 and Mobile-3 recover frame 1. Note that no polling message is sent along with retransmissions. Mobile-0 now advances to send the new frame 6 and along with it determines, for example, by way of a probabilistic polling method including a weighted ranking to poll Mobile-3. Note that the polling mechanism is such that it polls poor users more often than good users. Hence, although it might appear that mobile-2 should be polled here, instead of Mobile-3, it should be noted that on average mobile-2 does indeed get polled more often than mobile-3. Now, Mobile-3 had a, frame 1 missing, but it was already recovered by retransmissions for Mobile-1. Hence it does not send any NAK. The specifics of the weighting and ranking with respect to the different polling mechanisms are discussed in greater detail herein.

At time t=t3, Mobile-0 discovers that no NAK was received from any user and it hence proceeds to transmit frame 7 and [in accordance w/the polling mechanism] polls Mobile-2. Assume that all mobiles except mobile-i receive this frame correctly. Since Mobile-2 still needs to recover frame 2, it sends a NAK and after the retransmission of frame 2, both Mobiles 2 and 4 have recovered the frame, although Mobile-4 never explicitly requested the retransmission. At t=t4, Mobile-0 proceeds to frame 8 and decides to poll Mobile-4. However, since mobile-4 has no frames missing, it doesn't send any NAK and at time t=t5, mobile-0 proceeds to transmit new frame number 9 and decides to again poll Mobile-1. Assume that all mobiles, except Mobile-2, correctly receive this frame 9. Now, since Mobile-l has frame 7 missing, it sends a NAK requesting a retransmission and Mobile-0 completes retransmitting frame 7 and proceeds to transmit frame 10 as well as poll Mobile-2. The invention continues in this fashion.

The present invention provides some significant advantages over prior art methodologies. A first advantage is faster delivery of the overall multicast transmission. Since the invention starts polling the user who is "most likely" to have an erroneous frame, the retransmission performed aids all the other users who may have lost the same frame. Hence, the invention delivers useful data in a fast manner (for a given reliability metric, e.g. $10^{-10}$ residual error).

Another significant advantage relates to energy efficiency. Since the mobiles need to NAK only when asked, they do not have to transmit unnecessary NAKs and hence save energy. This is of high importance in wireless multi-access systems such as 802.11 wireless LANs and 3G cellular systems, since the mobile nodes have limited battery power. Moreover, since the mobile with the poorest RF condition is asked to NAK first, the likelihood of other mobiles additionally NAKing is dramatically reduced, resulting in suppression of more NAKs.

The proposed scheme presents a layered approach that provides reliability at the link layer and can be regarded as a supplement to the reliability that may be provided at the transport and/or application level. Hence, the invention can potentially enhance the end users experience while minimizing the system resources.

Figure 3:
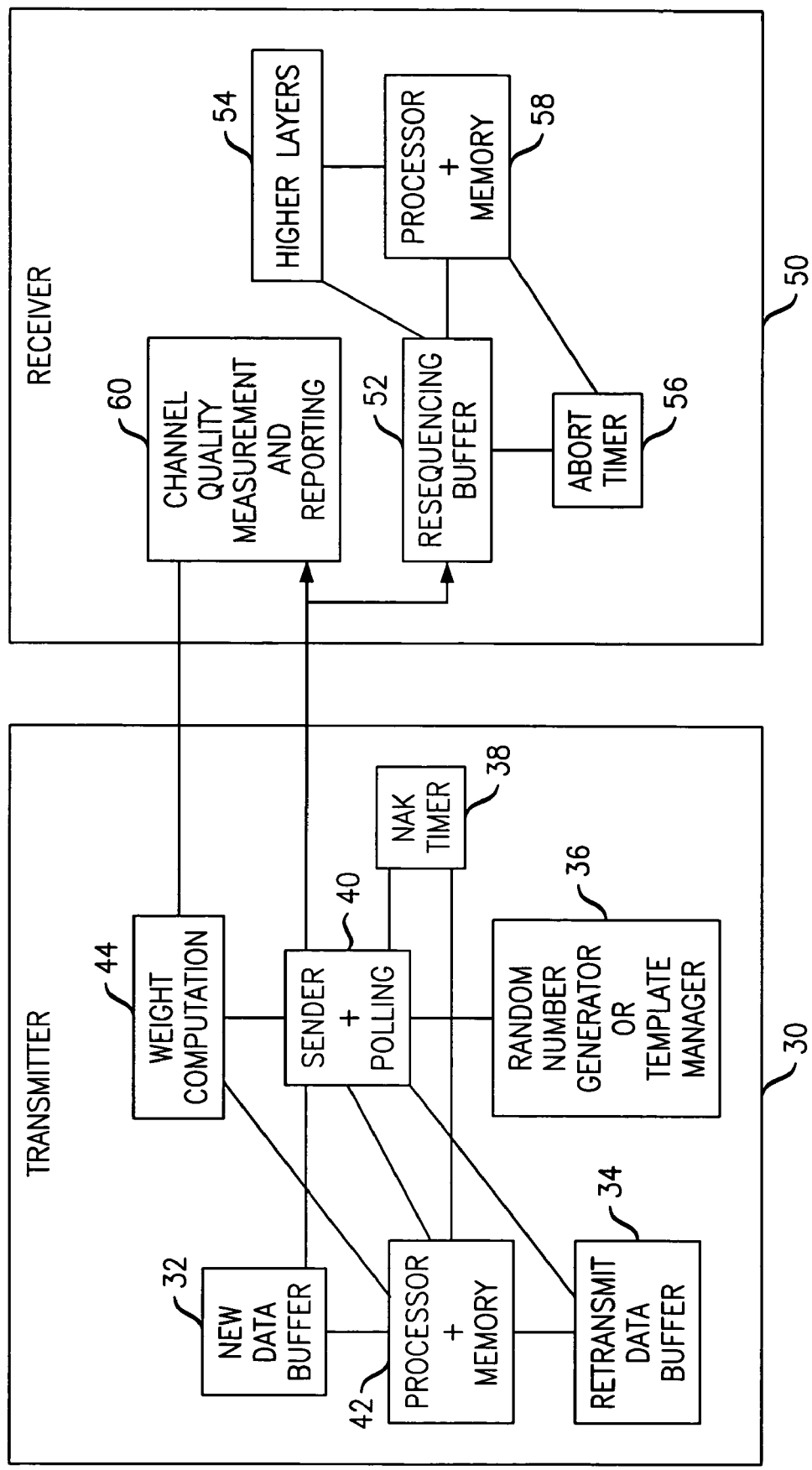
FIG. 3 is an exemplary block diagram of a transmitter and receiver device used in connection with the present invention.

Referring to FIG. 3, a block diagram of exemplary transmitter and receiver units 30, 50 used in accordance with the present invention is shown. The transmitter 30 includes a new data buffer 32, e.g., additional buffer space, that stores higher layer packets that need to be transmitted to the mobiles. Any time a packet is transmitted, a copy of the packet is stored in a retransmit data buffer 34 so that if the mobile requests retransmission of this frame, the transmitter has a copy of it to send. A random number generator 36 used for the probabilistic method of polling (discussed herein) is coupled to a sender and polling mechanism 40. If the probabilistic method is not used, a template manager (also discussed herein) would be used in its place. A NAK timer 38 is needed so that the sender knows how long it needs to wait for a NAK to arrive from a mobile. In the exemplary embodiment, the sender and polling mechanisms 40 are integrated into a single functional entity that takes input from the data buffers, random number generator and the NAK timer. In addition, the transmitter includes a processor and memory 42 for carrying out the functionality of the present invention in conjunction with the sender and polling mechanisms 40 and other functional modules. A weight computation mechanism 44 is coupled to the processor and the sender and polling mechanism 40. The weight computation receives input from the receiver units 50 and is responsible for ranking the channel conditions of each of the receivers involved in a multicast transmission.

With respect to the receiver 50, a re-sequencing buffer 52 is included that orders the out-of-order packets. The buffer sends NAKs to the transmitting mobile and once the data has been received correctly, the correctly received packets are sent to the higher layers 54. Also shown in the receiver is an abort timer 56 which is needed for the receiver to determine if it has spent too much time in recovering a particular frame. By choosing appropriate values for the frame sequence number range, NAK timer and Abort timer, the protocol can work correctly. Choosing such appropriate values has been well addressed in the prior art. The receiver also includes a processor and memory 58 for carrying out the functionalities of the present invention in the receiver in combination with other shown functional modules. The receiver additionally includes a channel quality measurement and reporting function 60 for reporting channel quality information back to the transmitter as discussed.

Weight Computation and Poll Selection

The weight computation and poll selection process used in accordance with the invention is now described. As mentioned previously and as known in the art, a transmitting node has capability to provide a measure of the frame error rates and/or channel strength measurements between itself and the K receiving nodes. Let us denote the Frame Error Rate measurements as FER[1], FER[2], . . . , FER[K]. Similarly, if signal strength measurements are available in place of Frame Error Rate measurements, then denote the signal strength measurements as S[1], S[2]. . . , S[K]. The weight of a particular mobile-i is defined as:

$$W[i] = \frac{FER[i]}{\sum_{j=1}^{K} FER[j]}$$

when the Frame Error Rate measurements are available and as:

$$W[i] = \frac{\frac{1}{S[i]}}{\sum_{j=1}^{K} \frac{1}{S[j]}}$$

when the signal strength measurements are available. Note that in order for the scheme to accommodate extreme dynamic ranges of channel qualities, it is imperative that the variables FER[i] and S[i] need to be scaled such that $$1 \leq \frac{\max(FER[i])}{\min(FER[i])} \leq \Omega, \text{ or, } 1 \leq \frac{\max(S[i])}{\min(S[i])} \leq \Omega,$$

where $\Omega$ is the maximum spread parameter with an exemplary value of 100. Note that by setting it to 1, the differences in channel conditions completely ignored.

Probabilistic Method

Define P[i], the sum of probabilities of mobile 1 through i, as follows:

$$P[i] = \sum_{j=1}^{i} W[j]$$

Once the Weights are computed, there are several possibilities regarding how one could select the user for polling based on the weight. Two exemplary methods are presented. A first is a Probabilistic Method. Here, anytime the transmitting node needs to determine who is the user that needs to be polled for NAK feedback, it generates a random variable uniformly distributed between 0 and 1. Let us denote the random number as X. Then the transmitter proceeds as follows:

If $(X \leq P[1])$

Choose Mobile-1;

If $(P[1] < X \leq P[2])$

Choose Mobile-2;

...

...

...

If $(P[K-1] < X \leq P[K])$

Choose Mobile-K;

Template Method

An other poll selection method is termed a Template Method. Here, based on the weights, a template of the mobiles that you are going to poll is computed. This method can be thought of as a designated sequence for a multicast session which is computed as follows:

1. First, define the numbers N[1], ... N[K] as:

$$N[i] = \left\lceil \frac{W[i]}{W[K]} \right\rceil, i = 1, 2, \ldots K$$

2. Define $$N_T = \sum_{i=1}^{K} N[i]$$

3. The transmitting node creates a template for a cycle of $N_T$ poll messages and initializes M[i]=N[i], i=1, 2, ... K.

4. Essentially, anytime it needs to decide who is to be polled it performs the following:

```
Prev_polled = p;
Flag=-1;
q=p;
Count=0;
```

-continued

```
While(Flag==-1 && Count <= K)
{
    q=(q+1)%(K+1);
    If(M[q] > 0)
        Next_Polled=q;
        Flag=1;
        M[q]=M[q]-1;
        Count = Count + 1;
}
If(Flag != -1)
    Prev_Polled = Next_Polled;
```

5. It is clear that this loop will be executed exactly $N_T$ times, before all the M[I] become 0.

6. When all the M[I] become 0, go back to step 3.

In order to better understand the template method, consider that K=3 and the frame error rates are such that FER[1]=0.1, FER[2]=0.03 and FER[3]=0.01. Hence, N[1]=10, N[2]=3, N[3]=1. So, the template length $N_T$ is equal to 10+3+1=14. At time t=t0 we initialize M[1]=N[1], M[2]=N[2] and M[3]=N[3] and the method proceeds as follows. Start by polling mobile-1 and decrement M[1] so M[1] now becomes 9. We then poll Mobile-2 and decrement M[2] so M[2] now becomes 2. At time t=t3, we poll Mobile-3 so M[3] becomes 0. This means that Mobile-3 will not be polled until the template length of 14 polls is completed. Hence, at time t4, Mobile-1 gets polled reducing M[1] to 8. At t5, Mobile-2 gets polled making M[2] to be 1. At t6, Mobile-1 is polled again so M[1] now is 7. At t7, Mobile-2 is polled finally to make M[2] also 0. Now, from t8 to t14, only mobile-1 is polled since it the only user with non-zero value of M. After t15, a new template will start. The values of template length and N[i] are recomputed again based on the new FER measurements reported.

It would be understood by those skilled in the art that the template method and the probabilistic method can both work well in practice or one can be chosen in preference to another depending upon the particular case of interest. In addition, as would be understood, the present invention also contemplates polling methodologies other than probabilistic or template once the weights are computed.

Two other approaches for polling which do not consider the user weights to dynamically determine who is the next user to be polled are now discussed. A first is fixed polling. In such a method, the transmitting node decides apriori who it is going to poll. For example, the transmitting node can choose to poll only the user with the poorest channel condition. Hence, unless the channel conditions of the users are all changing independently, identically and fast, the chances that different mobiles are polled are quite small. This is especially true in cases of indoor wireless access systems like Wireless LANs where mobility is limited. Hence, it is highly likely that the users who are not in the worst channel conditions are never polled. While this method is simple, it is plagued by performance problems as will be discussed later.

Another method that does not use weight computations to differentiate users is the simple round robin approach or other similar methods. This approach does not need any weights. It simply starts with Mobile-1, then to Mobile-2, and so on to Mobile-K and then back to Mobile-1 again. Clearly, this approach does not work as well as methods which take the channel condition into account explicitly.

Simulation Results

Numerical results illustrating the performance of the proposed methodology for reliable multicast in a wireless system are presented. In particular an IEEE 802.11 Wireless LAN system performance evaluation is chosen. One exemplary embodiment of the present invention methodology, which computes the weights corresponding to each user and depending upon the weights chooses a user who should be polled is compared with that of two other methods. The results presented are for the probabilistic method and not the template method.

The invention is first compared against a fixed polling scheme. As mentioned, the invention focuses primarily on the user with the poorest channel condition at any given time. In the simulations presented, static channel conditions are utilized, i.e. the user's channel never changes, with user-1 having the worst channel condition and user-K having the best channel condition. In a second comparison, the simple Round Robin polling mechanism described above is considered. As discussed, this mechanism is simple but does not differentiate users by doing any kind of weight computation.

Figure 4:
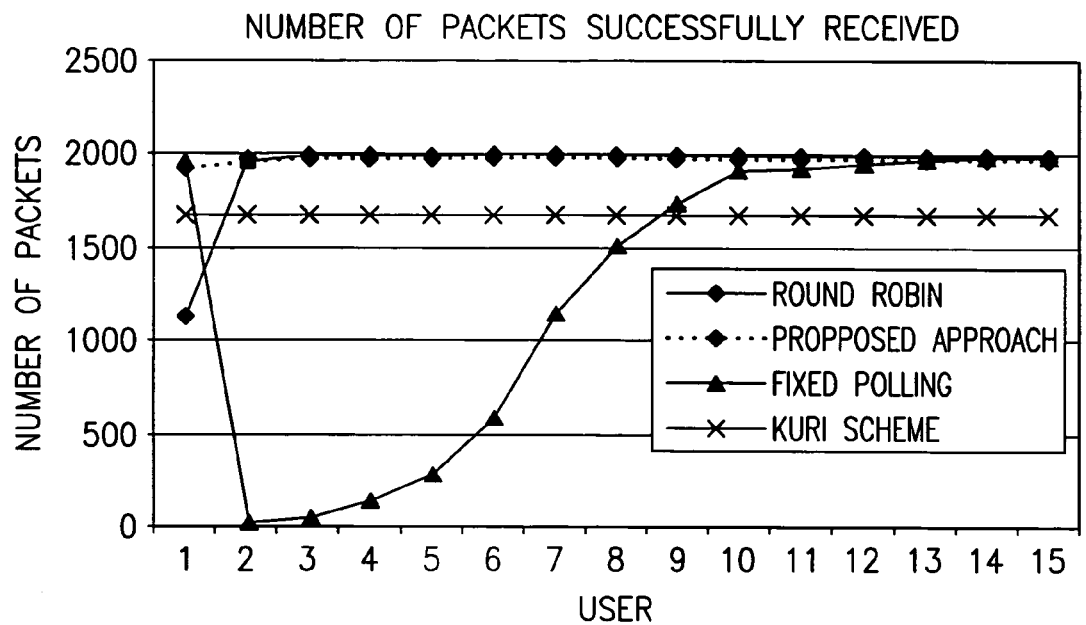
FIG. 4 shows a graphic representation of simulation results of the present invention methodology versus other prior art method.

Referring to FIG. 4, the simulation scenario is as follows. A 15 user scenario is considered—hence K=15. The users' channel condition is such that User-1 has the highest Frame Error Rate (10%) and User-15 has the lowest Frame Error Rate ($10^{-6}$). The remaining users have Frame Error Rates between these two extremes with the constraint that Frame Error Rate is monotonically decreasing. FIG. 1 shows the number of packets successfully received (after retransmissions) at each of the users (mobiles). It is clear that the present invention method delivers almost the maximum number of packets to all users, i.e., users with good and bad channel conditions. The fixed polling method was designed to always poll the user with the worst channel conditions (User-1). It can be seen that with the fixed polling method, User-1 obviously receives almost the maximum number of packets and so do users with very good channel conditions. This is simply because all retransmissions from User-1 are honored and the users in very good channels do not have many erroneous frames to be retransmitted. Moreover, the retransmissions made for User-1 could help them retrieve any of their lost frames. The interesting region is with respect to users having channel conditions in the middle of the two extremes. These users have non-trivial error rates, but since they are never polled, they remain with a lot of lost frames. Note that since the channels between the transmitter and the K receivers are independent of one another, it is not necessary that all the users see the same lost frame. Hence, although the transmitter retransmits the frames requested by User-1, it is not necessarily true that the retransmitted frames completely help the other nodes.

Figure 5:
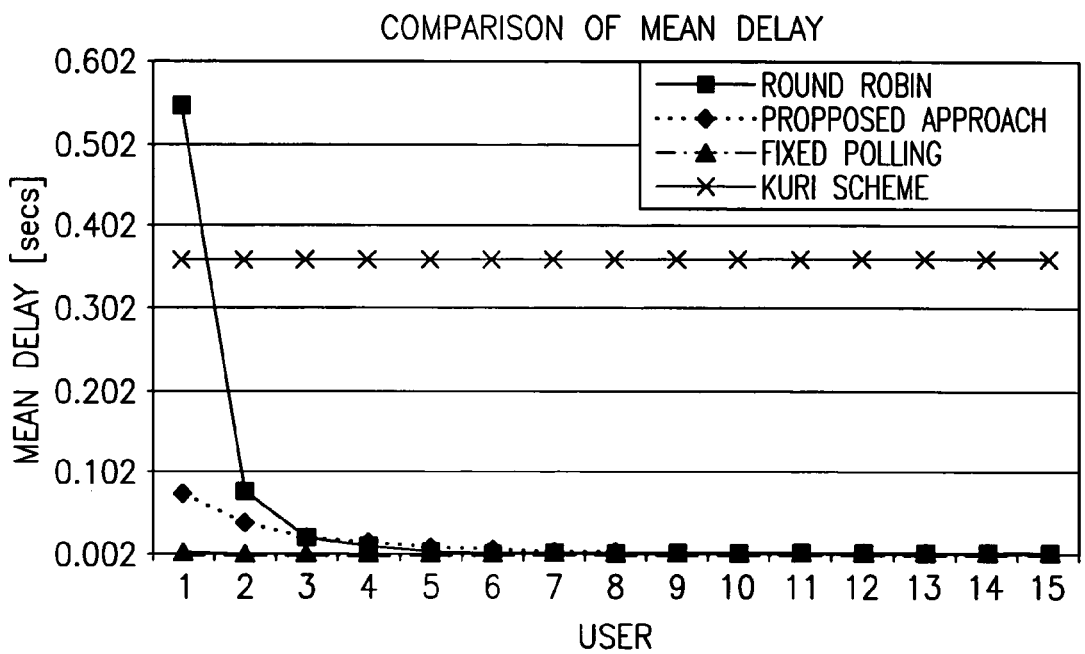
FIG. 5 shows another graphic representation of simulation results of the present invention methodology versus other prior art methods.

With the round robin approach, the results of which are illustrated in FIG. 5, performance is better than with the fixed polling scheme. However, it is noticeable that the number of packets received by the poorer users (for example User-1) is low. This is because the round robin approach treats all the users equally and hence the users with poorer channel conditions suffer. FIG. 5 shows the mean delay per successfully received packet. Again notice that the present invention works very well in that it keeps the mean delay per packet low even for users having poor channel conditions. The Round Robin approach clearly suffers from increased delays for users with poor channel conditions. It is interesting to observe that the fixed polling scheme has the lowest delay per packet. This is not, however, to be misunderstood to mean that it is good scheme. This is immediately clear by referring back to FIG. 1. As can be seen, the number of successfully received packets itself is quite low for users in the middle range. Since FIG. 2 merely illustrates the delay per successfully received packet, it means simply that using the fixed polling scheme, where whatever packets are received, such packets are received with small delay. However, as would be understood, many of the packets are likely to be never received. The leader based polling proposed by Kuri and Kasera is essentially a Stop and Go ARQ scheme. It treats everyone involved the same, but the penalty is in the reduced number of packets received and in a high delay per correctly received packet.

Based on the results shown in FIG. 4 and FIG. 5, it is demonstrated that the present invention works extremely well in terms of delivering a relative maximum number of successful packets while keeping the mean delay per packet small. Hence, the invention is well suited for scenarios where reliability is important and for scenarios where the delay per reliably delivered packet is small.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. Accordingly, the scope of the invention is limited only by the claims appended hereto.

What is claimed is:

1. A method of multicasting packets to a set of receiver nodes in a communications network, said method comprising the steps of:

providing a weighted ranking of the set of receiver nodes by channel conditions from poorest to best;

implementing a polling scheme to solicit retransmission requests one at a time from said set of receiver nodes, wherein said polling scheme solicits retransmission requests utilizing said ranking such that said receiver nodes having poorest relative channel conditions receive a significantly greater frequency of polling requests than said receiver nodes having better channel conditions, wherein utilization of said polling scheme enables receiver nodes other than those having a poorest relative channel condition to receive those lost frames being retransmitted to the nodes having poorest relative channel condition.

2. The method of claim 1, wherein a control message is included with multicast transmissions dictating which of said nodes is allowed to respond to said retransmission requests.

3. The method of claim 1, wherein said polling requests begin with a receiver having the worst channel condition.

4. The method of claim 1, wherein said polling scheme is based on a probabilistic mechanism, said receiver nodes selected to offer retransmission requests based on a weighted probability related to channel condition.

5. The method of claim 1, wherein said polling mechanism is a template mechanism, a predetermined polling order being set up in a template for a limited transmission interval.

6. The method of claim 1, wherein ranking is performed utilizing a frame error rate of said receiver nodes.

7. The method of claim 1, wherein ranking is performed utilizing relative signal strengths of said receiver nodes.

8. The method of claim 1, wherein ranking of said receiver nodes is dynamically altered based on changing weights related to channel conditions of said receiver nodes.

9. The method of claim 1, wherein said retransmission requests from said receiver nodes are negative acknowledgements.

10. A method of multicasting packets to a set of receiver nodes in a wireless transmission network, said method comprising the steps of:
   identifying in a rank order said receiver nodes that are most likely to experience a frame error of a multicast transmission;
   transmitting said multicast transmission to said set of receiver nodes;
   requesting retransmissions primarily from said receiver nodes most likely to experience a frame error using said rank order;
   retransmitting at least a portion of said multicast transmission indicated by requested ones of said receiver nodes, said portion of said multicast transmission being made available to be received by said set of receiver nodes.

11. The method of claim 10, wherein a control message is included with multicast transmissions dictating which of said nodes is allowed to respond to said retransmission requests.

12. The method of claim 10, wherein a polling request requesting retransmissions from said receiver nodes begin with a receiver having the worst channel condition.

13. The method of claim 10, wherein a polling scheme requesting retransmissions from said receiver nodes is based on a probabilistic mechanism, said receiver nodes selected to offer retransmission requests based on a weighted probability related to channel condition.

14. The method of claim 10, wherein a polling scheme requesting retransmissions from said receiver nodes is a template mechanism, a predetermined polling order being set up in a template for a limited transmission interval.

15. An apparatus for multicasting packets to a set of receiver nodes in a communications network, said apparatus comprising:
   a processor for providing a weighted ranking of the set of receiver nodes by channel conditions from poorest to best;
   said processor further operable to implement a polling scheme to solicit retransmission requests one at a time from said set of receiver nodes, wherein said polling scheme solicits retransmission requests utilizing said ranking such that said receiver nodes having poorest relative channel conditions receive a significantly greater frequency of polling requests than said receiver nodes having better channel conditions, wherein utilization of said polling scheme enables receiver nodes other than those having a poorest relative channel condition to receive those lost frames being retransmitted to the nodes having poorest relative channel condition.

16. The apparatus of claim 15, wherein a control message is included with multicast transmissions dictating which of said nodes is allowed to respond to said retransmission requests.

17. The apparatus of claim 15, wherein said polling requests begin with a receiver having the worst channel condition.

18. The apparatus of claim 15, wherein said polling scheme is based on a probabilistic mechanism, said receiver nodes selected to offer retransmission requests based on a weighted probability related to channel condition.

19. The apparatus of claim 15, wherein said polling mechanism is a template mechanism, a predetermined polling order being set up in a template for a limited transmission interval.

20. The method of claim 15, wherein ranking of said receiver nodes is dynamically altered based on changing weights related to channel conditions of said receiver nodes.

21. An apparatus for receiving multicast packets from a transmitter node in a communications network, said transmitter node providing a weighted ranking of the set of receiver nodes by channel conditions from poorest to best, said transmitter further implementing a polling scheme to solicit retransmission requests one at a time from said set of receiver nodes; said apparatus comprising:
   a processor for controlling operation of said receiver, wherein said receiver responds to said retransmission requests using negative acknowledgements for specific packets, said receiver responding only when solicited by said transmitter, wherein utilization of said polling scheme enables a receiver other than those having a poorest relative channel condition to receive lost frames being retransmitted to the nodes having poorest relative channel condition.

* * * * *